United States Patent [19]

Campbell et al.

[11] 4,065,443
[45] Dec. 27, 1977

[54] VULCANIZATION OF RUBBER WITH PHOSPHINOTHIOYL AMINO SULFIDES

[75] Inventors: Robert H. Campbell; Raleigh W. Wise, both of Akron, Ohio

[73] Assignee: Monsanto Company, St. Louis, Mo.

[21] Appl. No.: 705,672

[22] Filed: July 15, 1976

[51] Int. Cl.² ............................................. C08F 28/00
[52] U.S. Cl. ..................... 260/79.5 B; 260/23.7 M; 260/79.5 A; 260/783; 260/784; 260/785; 260/790; 260/792; 260/793; 260/934
[58] Field of Search .................. 260/934, 783, 79.5 B, 260/79.5 A, 79.5 C

[56] References Cited

U.S. PATENT DOCUMENTS

| | | | |
|---|---|---|---|
| 2,891,059 | 6/1959 | Malz et al. | 260/934 |
| 3,044,981 | 7/1962 | Malz et al. | 260/934 |
| 3,057,832 | 10/1962 | Brock | 260/79.5 A |
| 3,419,521 | 12/1968 | Scott et al. | 260/926 |
| 3,544,531 | 12/1970 | Morita | 260/79.5 A |

*Primary Examiner*—Ronald W. Griffin

[57] ABSTRACT

Phosphinothioyl amino sulfides of the formula

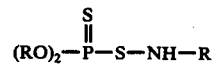

are improved accelerators for the vulcanization of rubber.

18 Claims, No Drawings

VULCANIZATION OF RUBBER WITH PHOSPHINOTHIOYL AMINO SULFIDES

This invention concerns vulcanizable rubber compositions containing phosphinothioyl amino sulfide accelerators and processes for vulcanizing rubber using the aforesaid accelerators. More particularly, it concerns vulcanizable compositions containing sulfenamides derived from dithiophosphoric acids and primary amines.

Vulcanization accelerators and co-accelerators, sometimes called activators, are used by rubber manufacturers to improve the vulcanization process by reducing the time required to cure a vulcanizable composition. Many common co-accelerators decrease the processing safety of the stocks which reduction in safety can lead to loss of the stock if premature vulcanization should occur. The accelerators of this invention are delayed action accelerators and as coaccelerators, they activate the vulcanization rate without adversely affecting processing safety.

SUMMARY OF THE INVENTION

It has been discovered that sulfenamides derived from dithiophosphoric acids and primary amines are accelerators for the vulcanization of rubber, and are especially potent coaccelerators with other accelerators with the accelerator combination exhibiting faster cure rates than equal quantities of either accelerator alone. Rubber compositions containing accelerators of the invention exhibit fast cure rates, improved processing safety and produce strong vulcanizates. Accelerators of the invention are phosphinothioyl amino sulfides of the formula

in which R and $R_1$ independently are alkyl of 1 to 12 carbon atoms, cycloalkyl of 5 to 8 carbon atoms, alkaryl of 7 to 10 carbon atoms, phenyl or mono- or di-lower alkyl substituted phenyl. Examples of R and $R_1$ are methyl, ethyl, propyl, isopropyl, butyl, isobutyl, sec-butyl, tert-butyl, pentyl, hexyl, heptyl, octyl, 2-ethylexyl, tert-octyl(1,1,3,3-tetramethylbutyl), nonyl, decyl, undecyl, dodecyl, cyclopentyl, cyclohexyl, 2-methylcyclohexyl, 4-methylcyclohexyl, 2,6-dimethylcyclohexyl, cyclooctyl, benzyl, xylyl, isopropylbenzyl, alpha-methylbenzyl, alpha, alpha dimethylbenzyl, phenethyl, phenylpropyl, phenyl, tolyl, xylenyl, ethylphenyl, propylphenyl, cumenyl, butylphenyl and t-butylphenyl. Preferably, R and $R_1$ are lower alkyl of 1 to 5 carbon atoms and more preferably, $R_1$ is secondary or tertiary alkyl. Examples of suitable accelerators are:
  dimethoxyphosphinothioyl methylamino sulfide
  dimethoxyphosphinothioyl ethylamino sulfide
  dimethoxyphosphinothioyl propylamino sulfide
  dimethoxyphosphinothioyl isopropylamino sulfide
  dimethoxyphosphinothioyl butylamino sulfide
  dimethoxyphosphinothioyl sec-butylamino sulfide
  dimethoxyphosphinothioyl tert-butylamino sulfide
  dimethoxyphosphinothioyl cyclohexylamino sulfide
  dimethoxyphosphinothioyl benzylamino sulfide
  dimethoxyphosphinothioyl anilino sulfide
and related compounds wherein the dimethoxy radicals are replaced by diethoxy, dipropoxy, diisopropoxy and the like.

Other examples of suitable accelerators and a method for their preparation are described in Zhurnal Obshchei Khimii, Vol. 43, No. 9, pages 1916–1918, Sept. 1973, C. A. Vol. 79, 145918w. The accelerators may also be prepared by the reaction of an alkali metal salt of a dithiophosphoric acid and a N-halo primary amine or by the reaction of a phosphinothioyl sulfenyl chloride and a primary amine.

The accelerators of this invention are utilized in the same manner as conventional accelerators, by incorporation into the rubber compositions and heating to effect vulcanization. The quantity required varies depending upon the properties desired in the vulcanizate. Amounts of 0.2–10 parts of accelerator per 100 parts rubber are suitable with amounts of 0.5–3.0 parts per 100 parts rubber being the range normally employed. The phosphinothioyl amino sulfides of the invention can be used in any sulfur vulcanizable diene rubber. Natural and synthetic rubbers and mixtures thereof are suitable. Synthetic rubbers include cis-4-polybutadiene, butyl rubber, ethylene-propylene terepolymers (EPDM rubber), polymers of 1,3-butadiene, polymers of isoproene, copolymers of 1,3-butadiene with other monomers, for example, styrene, acrylonitrile, isobutylene, and methylmethacrylate.

The phosphinothioyl amino sulfides are accelerators for the vulcanization of rubber compositions containing sulfur-vulcanizing agents and may be used without other accelerators being present, but they are especially potent when used with conventional accelerators. Sulfur-vulcanizing agent means elemental sulfur or sulfur containing vulcanizing agent which at cure temperature or below releases sulfur in the form available to crosslink the rubber. Illustrative vulcanizing agents are amine disulfide and polymeric polysulfide, for example, alkyl phenol disulfides and dimorpholinoidisulfide. The rubber compositions may contain the usual compounding ingredients, for example, reinforcing pigments such as carbon black or silica, metal oxide activators such as zinc oxide, stearic acid, antidegradants of the phenolic or amine type, for example, alkylene-bridged cresols, styrenated phenol, sterically-hindered hydroquinones, quinones and N-alkyl-N'-phenyl-p-phenylenediamines.

The phosphinothioyl amino sulfides of the invention may be used in combination with conventional accelerators including thiazole accelerators, dithiocarbamate accelerators, thioperoxydiphosphate accelerators, zinc phosphorodithioate accelerators, thiuram sulfide accelerators, aldehyde-amine accelerators, diaryl guanidine accelerators, and mixtures thereof. For certain applications, it is sometimes advantageous to employ curative combinations. Examples of conventional materials which may be used in combination with the aforesaid sulfides of this invention are 2-mercaptobenzothiazole, bis(2-benzothiazolyl) disulfide, N-cyclohexyl-2-benzothiazolesulfenamide, N-tertbutyl-2-benzothiazolesulfenamide, N-diisopropyl-2-benzothiazolesulfenamide, 2-(morpholinothio) benzothiazole, 2(hexadhydro-1H-azepin-1-yl) benzothiazole, tetraisopropoxy thioperoxydiphosphate, zinc-O,O-di-n-butylphosphorodithioate, tetramethylthiuram disulfide, tetraethyl thiuram disulfide, tetramethyl thiuram monosulfide and diphenylguanidine.

For the rubber stocks tested and described herein as illustrative of the invention. Mooney scorch times are determined by means of a Mooney plastometer. The time in minutes ($t_5$) required for the Mooney reading to rise five points above the minimum viscosity is recorded. Longer times on the Mooney scorch test are desirable because this indicates greater processing safety. Cure characterstifcs are determined at the designated temperatures according to ASTM procedure D-2084(37). From the rheometer data, the maximum torque, R max., in Newton meters is reported. The increase in torque is a measure of the degree of vulcanization and is proportional to the cross-link density. The time, $t_2$, in minutes for a raise of two rheometer units above the minimum reading of the rubber sample, and the time, $t_{90}$, required to obtain a torque of 90 percent of the maximum is recorded. The difference, $t_{90}-t_2$, is a measure of the cure rate of the sample. Reversion, a measure of cross-link scission, is determined by observing the decrease in rheometer torque after maximum torque is achieved. Reversion is reported in Newton meters and is the difference in rheometer maximum torque and rheometer torque 10 minutes after maximum torque is achieved. Vulcanizates are prepared by press curing at the selected temperature for the time indicated by the rheometer data to obtain optimum care. The physical properties of the vulcanizates are measured by conventional methods.

DESCRIPTION OF PREFERRED EMBODIMENTS

The vulcanization of rubber with the accelerator/activators of this invention is demonstrated with the following rubber masterbatches. All parts are by weight. Santoflex 13, an antidegradant, is N-1,3-dimethylbutyl-N'-phenyl-p-phenylenediamine; Santocure NS, an accelerator, is N-tert-butyl-2-benzothiazolesulfenamide; Santocure MOR, an accelerator, is 2-(morpholinothio)-benzothiazole; Thiofide, an accelerator, is bis(2-benzothiazolyl)disulfide; DPG, an accelerator, is diphenylguanidine; and Mono Thiurad, an accelerator, is tetramethylthiuram monosulfide.

-continued $$(RO)_2-\overset{\overset{S}{\|}}{P}-S-NH-R_1$$

| Accelerator | R | $R_1$ |
|---|---|---|
| H | n-hexyl | t-butyl |
| I | n-octyl | t-butyl |
| J | n-decyl | t-butyl |
| K | n-dodecyl | t-butyl |
| L | cyclohexyl | t-butyl |
| M | ethyl | t-butyl |
| N | n-butyl | phenyl |

Vulcanizable compositions are prepared by mixing sulfur and accelerator(s) with portions of a rubber masterbatch. The properties of the stocks are determined as previously described and are shown in Tables 1–5.

The accelerator activity of phosphinothioyl amino sulfides of the invention in a natural rubber masterbatch is illustrated in Tables 1 and 2. Referring to Table 1, Stock 1 is a control with a commercial accelerator. Stocks 2 and 3 demonstrate phosphinothioyl amino sulfides are primary accelerators having greater safety than the commercial accelerator but that they are somewhat weaker and slower curing. The data of Stocks 4 and 5 containing the same total accelerator concentration as in Stocks 1–3 but with equal proportions of the commercial accelerator and accelerator of the invention show that the accelerator combination gives a faster cure rate than either accelerator alone with the extent of cure being equal to that obtained with the commercial accelerator but with greater processing safety. In addition, the reversion resistance of the Stocks 4 and 5 containing the accelerator combination is substantially improved. Stock 6 is a control with a different commercial accelerator. Stock 7 demonstrates that the addition of 0.2 part by weight of an accelerator of the invention to a composition of Stock 6 increases the processing

| Masterbatch | RUBBER MASTERBATCHES | | | | | |
|---|---|---|---|---|---|---|
| | A | B | C | D | E | F |
| Natural rubber | 100 | — | — | — | — | — |
| Oil-extended SBR[1] | — | 137.5 | 137.5 | — | — | — |
| EPDM rubber | — | — | — | 100[2] | 100[3] | 100[2] |
| Carbon black (ISAF) | 45.0 | 68.0 | 65.0 | — | — | — |
| Carbon black (HAF) | — | — | — | — | — | 80 |
| Carbon black (FEF) | — | — | — | 70.0 | 70.0 | — |
| Extender oil | — | — | — | 40.0 | 40.0 | 40.0 |
| Zinc oxide | 3.0 | 3.0 | 3.0 | 5.0 | 5.0 | 5.0 |
| Stearic acid | 2.0 | 2.0 | 1.0 | 0.5 | 0.5 | — |
| Hydrocarbon soft. | 5.0 | — | 1.5 | 3.0 | 3.0 | — |
| Santoflex 13 | 2.0 | 1.0 | 2.0 | — | — | — |
| Total | 157.0 | 212.0 | 210.0 | 218.5 | 218.5 | 225.0 |

[1]Rubber contains 37.5 parts by weight oil.
[2]Terpolymer of 55 weight percent ethylene, 42.5 weight percent propylene, 2.5 weight percent 1,4 hexadiene, Mooney viscosity90 (ML-8, 100° C) polydispersity greater than 20.
[3]Terpolymer of 55 weight percent polyethylene, 35.5 weight percent propylene, 9.5 weight percent ethylene norbornene, Mooney viscosity 80 (ML-8, 100° C), polydispersity 3.

The invention is illustrated with the following phosphinothioyl amino sulfide accelerators:

$$(RO)_2-\overset{\overset{S}{\|}}{P}-S-NH-R_1$$

| Accelerator | R | $R_1$ |
|---|---|---|
| A | isopropyl | t-butyl |
| B | isopropyl | isopropyl |
| C | n-butyl | t-butyl |
| D | n-butyl | isopropyl |
| E | n-butyl | cyclohexyl |
| F | n-butyl | 1,1,3,3-tetramethylbutyl |
| G | isopropyl | 1,1,3,3-tetramethylbutyl | safety, the state of cure and the cure rate. Stocks 8 and 9 are controls with Stock 8 containing a commercial accelerator alone and Stock 9 containing the commercial accelerator and a commercial co-accelerator. Stocks 10 and 11 illustrate compositions of the invention containing phosphinothioyl amino sulfide as co-accelerators. The data show that the compositions of Stocks 10 and 11 cure faster yet exhibit substantially greater processing safety than the commercial compositions.

The accelerator activity of other accelerators of the invention is demonstrated in Table II. The data demonstrate that phosphinothioyl amino sulfides are potent delayed action primary accelerators.

TABLE 1

|  | 1 | 2 | 3 | 4 | 5 | 6 | 7 | 8 | 9 | 10 | 11 |
|---|---|---|---|---|---|---|---|---|---|---|---|
| Masterbatch A | 157.0 | → | → | → | → | → | → | → | → | → | → |
| Sulfur | 1.0 | 1.0 | 1.0 | 1.0 | 1.0 | 2.0 | 2.0 | 2.5 | 2.5 | 2.5 | 2.5 |
| Santocure NS | 1.0 | — | — | 0.5 | 0.5 | — | — | — | — | — | — |
| Santocure MOR | — | — | — | — | — | 0.5 | 0.5 | — | — | — | — |
| Thiofide | — | — | — | — | — | — | — | 0.8 | 0.8 | 0.8 | 0.8 |
| DPG | — | — | — | — | — | — | — | — | 0.3 | — | — |
| Accelerator A | — | 1.0 | — | 0.5 | — | — | — | — | — | 0.3 | — |
| Accelerator B | — | — | 1.0 | — | 0.5 | — | 0.2 | — | — | — | 0.3 |
| Mooney Scorch at 121° C |  |  |  |  |  |  |  |  |  |  |  |
| $t_5$, minutes | 29.1 | 43.1 | 48.5 | 36.3 | 37.9 | 23.0 | 34.6 | 10.0 | 6.6 | 12.8 | 13.0 |
| Rheometer at 144° C |  |  |  |  |  |  |  |  |  |  |  |
| max. torque, N.m | 7.0 | 6.0 | 5.9 | 7.0 | 6.9 | 6.7 | 7.6 | 6.8 | 8.2 | 8.4 | 8.2 |
| $t_{90} - t_2$ | 7.0 | 9.6 | 9.5 | 4.6 | 4.3 | 16.3 | 10.9 | 11.1 | 8.7 | 5.9 | 6.2 |
| Rheometer at 164° C |  |  |  |  |  |  |  |  |  |  |  |
| max. torque, N.m | 6.3 | 5.4 | 5.4 | 6.4 | 6.4 | 6.0 | 7.0 | — | — | — | — |
| Reversion (N.m/10 min) | 0.72 | 0.77 | 0.75 | 0.45 | 0.41 | 0.87 | 0.85 | — | — | — | — |

TABLE 2

|  | 1 | 2 | 3 | 4 | 5 | 6 |
|---|---|---|---|---|---|---|
| Masterbatch A* | 155 | 155 | 155 | 155 | 156 | 156 |
| Sulfur | 2.5 | 2.5 | 2.5 | 2.5 | 2.5 | 2.5 |
| Accelerator C | 0.5 | — | — | — | — | — |
| Accelerator D | — | 0.5 | — | — | — | — |
| Accelerator E | — | — | 0.5 | — | — | — |
| Accelerator N | — | — | — | 0.5 | — | — |
| Accelerator F | — | — | — | — | 0.5 | — |
| Accelerator G | — | — | — | — | — | 0.5 |
| Mooney Scorch |  |  |  |  |  |  |
| $t_5$, min. at 135° C | 12.9 | 11.7 | 12.7 | — | — | — |
| $t_5$, min. at 121° C | — | — | — | 45.5 | 37.2 | 41.7 |
| Rheometer at 153° C |  |  |  |  |  |  |
| max. torque, N.m | 5.7 | 5.4 | 5.3 | 4.0 | 4.6 | 5.1 |
| $t_{90} - t_2$ | 14.9 | 19.8 | 14.1 | 24.4 | 18.1 | 13.9 |
| Stress-Strain at 157° C |  |  |  |  |  |  |
| Cure time, min. | 30 | 30 | 30 | 45 | 35 | 30 |
| 300% M, Kg.cm$^2$ | 103 | 97 | 93 | 89 | 76 | 83 |
| TS, Kg./cm$^2$ | 222 | 221 | 218 | 198 | 232 | 247 |
| Elongation % | 530 | 550 | 550 | 510 | 620 | 640 |

Masterbatch A the same as in Table 1 except Stocks 1–4 contain no Santoflex 13 and Stocks 5–6 contain only one part Santoflex 13.

Vulcanizable synthetic rubber compositions of the invention are illustrated in Tables 3 and 4. The data of Table 3 show the results of a study of the effect of the alkoxy group of the accelerator upon primary accelerator activity. All of the accelerators are derived from t-butylamine with the R group of the phosphinothioyl portion varied as indicated. The data of Stocks 1–6 demonstrate that as the size of the alkyl group increases the processing safety increases but both the cure rate and potency of the accelerator decrease. The data of Stock 7 indicate that a composition containing an accelerator derived from di(cyclohexyloxy)thioperoxyphosphate has greater processing safety but cures slower than a composition of Stock 3 containing an accelerator of essentially the same molecular weight derived from di(n-hexyloxy) thioperoxyphosphate.

Stocks 2–4 of Table 4 show a concentration study using diisopropoxyphosphinothioyl isopropylamino sulfide as a co-accelerator. Stock 1 is a control with a commercial accelerator alone. The data show that the cure rate increases with increasing concentration of co-accelerator and that the time required to achieve optimum cure is reduced by twenty minutes by using one part by weight co-accelerator. The data further show that the use of co-accelerator of the invention does not reduce the processing safety which is often the case with conventional co-accelerators. Stock 6 demonstrates that 0.4 parts by weight of a co-accelerator of the invention enhances the cure rate of a composition contain Thiofide accelerator and reduces the optimum cure time by twenty minutes without adversely affecting the processing safety.

TABLE 3

$$(RO)_2\overset{S}{\underset{\|}{P}}-S-NHC(CH_3)_3$$

|  | R | 1 | 2 | 3 | 4 | 5 | 6 | 7 |
|---|---|---|---|---|---|---|---|---|
| Masterbatch B |  | 212 | → | → | → | → | → | → |
| Sulfur |  | 1.75 | → | → | → | → | → | → |
| Accelerator A | isopropyl | 1.5 | — | — | — | — | — | — |
| Accelerator C | n-butyl | — | 1.5 | — | — | — | — | — |
| Accelerator H | n-hexyl | — | — | 1.5 | — | — | — | — |
| Accelerator I | n-octyl | — | — | — | 1.5 | — | — | — |
| Accelerator J | n-decyl | — | — | — | — | 1.5 | — | — |
| Accelerator K | n-dodecyl | — | — | — | — | — | 1.5 | — |
| Accelerator L | cyclohexyl | — | — | — | — | — | — | 1.5 |
| Mooney Scorch at 135° C |  |  |  |  |  |  |  |  |
| $t_5$, minutes |  | 15.8 | 14.7 | 18.5 | 24.9 | 37.9 | 39.5 | 37.5 |
| Rheometer at 153° C |  |  |  |  |  |  |  |  |
| max. torque, N.m |  | 6.2 | 5.8 | 5.5 | 5.3 | 5.0 | 4.8 | 4.9 |
| $t_{90} - t_2$ |  | 36.3 | 44.1 | 59.7 | 77.6 | 79.8 | 86.7 | 85.6 |

TABLE 3-continued $$(RO)_2\overset{\overset{S}{\|}}{P}-S-NHC(CH_3)_3$$

| R | 1 | 2 | 3 | 4 | 5 | 6 | 7 |
|---|---|---|---|---|---|---|---|
| Stress-Strain at 153° C | | | | | | | |
| Cure time, minutes | 90 | 90 | 120 | 120 | 120 | 120 | 120 |
| 300% M, Kg/cm² | 84 | 85 | 72 | 71 | 66 | 61 | 65 |
| TS, Kg./cm² | 220 | 219 | 207 | 201 | 200 | 194 | 205 |
| Elongation, percent | 590 | 610 | 640 | 640 | 660 | 680 | 690 |

TABLE 4

| | 1 | 2 | 3 | 4 | 5 | 6 |
|---|---|---|---|---|---|---|
| Masterbatch C | 210 | → | → | → | → | → |
| Sulfur | 2.0 | 2.0 | 2.0 | 2.0 | 1.8 | 1.8 |
| Santocure NS | 1.0 | 1.0 | 1.0 | 1.0 | — | — |
| Thiofide | — | — | — | — | 1.2 | 1.2 |
| Accelerator B | — | 0.3 | 0.5 | 1.0 | — | 0.4 |
| Mooney Scorch at 135° C | | | | | | |
| $t_5$, minutes | 22.0 | 22.8 | 22.8 | 22.0 | 13.0 | 14.3 |
| Rheometer at 153° C | | | | | | |
| max. torque, N.m | 7.1 | 7.1 | 7.5 | 8.0 | 6.8 | 7.1 |
| $t_{90} - t_2$ | 18.4 | 14.8 | 12.0 | 9.0 | 32.2 | 20.8 |
| Stress Strain at 153° C | | | | | | |
| Cure time, minutes | 50 | 45 | 40 | 30 | 70 | 50 |
| 300 % M, Kg./cm² | 92 | 97 | 105 | 120 | 84 | 91 |
| TS, Kg./cm² | 214 | 232 | 211 | 195 | 232 | 217 |
| Elongation, percent | 530 | 530 | 500 | 420 | 630 | 570 |

TABLE 5

| | 1 | 2 | 3 | 4 | 5 | 6 | 7 | 8 | 9 | 10 | 11 | 12 |
|---|---|---|---|---|---|---|---|---|---|---|---|---|
| Masterbatch D | 218.5 | 218.5 | 218.5 | 218.5 | 218.5 | — | — | — | — | — | — | — |
| Masterbatch E | — | — | — | — | — | 218.5 | 218.5 | 218.5 | 218.5 | — | — | — |
| Masterbatch F | — | — | — | — | — | — | — | — | — | 225.0 | 225.0 | 225.0 |
| Sulfur | 1.5 | 1.5 | 1.5 | 1.5 | 1.5 | 1.5 | 1.5 | 1.5 | 1.5 | 1.5 | 1.5 | 1.5 |
| Mono thiurad | 0.5 | 0.5 | 0.5 | 0.5 | 0.5 | — | — | — | — | 0.5 | 0.5 | 0.5 |
| Santocure NS | 1.5 | 1.0 | — | — | — | 1.0 | 1.0 | 1.0 | 1.0 | — | — | — |
| Thiofide | — | — | — | 1.0 | 1.5 | — | — | — | — | 1.5 | 1.5 | 1.5 |
| Accelerator C | — | 0.5 | 1.5 | 0.5 | — | — | 1.5 | — | — | — | 2.0 | — |
| Accelerator D | — | — | — | — | — | — | — | 1.5 | — | — | — | — |
| Accelerator E | — | — | — | — | — | — | — | — | 1.5 | — | — | — |
| Accelerator M | — | — | — | — | — | — | — | — | — | — | — | 2.0 |
| Mooney Scorch at 135° C | | | | | | | | | | | | |
| $t_5$, minutes | 27.2 | 26.8 | 32.6 | 18.2 | 18.0 | 40.3 | 38.0 | 32.5 | 31.2 | 13.6 | 21.1 | 19.4 |
| Rheometer at 160° C | | | | | | | | | | | | |
| max. torque, N.m | 4.9 | 4.4 | 3.7 | 4.8 | 4.8 | 7.5 | 7.4 | 7.1 | 7.3 | 6.9 | 7.0 | 7.2 |
| $t_{90} - t_2$ | 18.2 | 15.1 | 25.6 | 16.8 | 20.3 | 12.2 | 7.0 | 6.9 | 6.0 | 21.1 | 14.1 | 11.5 |
| Stress-Strain at 160° C | | | | | | | | | | | | |
| Cure time, min. | 45 | 40 | 50 | 45 | 45 | 45 | 30 | 25 | 25 | 60 | 40 | 35 |
| 300% M, Kg./cm² | 55 | 51 | 39 | 53 | 53 | 104 | 120 | 112 | 108 | 124 | 112 | 116 |
| TS, Kg./cm² | 176 | 164 | 163 | 149 | 179 | 141 | 133 | 122 | 116 | 239 | 211 | 204 |
| Elongation, % | 720 | 730 | 810 | 710 | 770 | 380 | 330 | 320 | 320 | 530 | 480 | 480 |

Vulcanizable EPDM rubber compositions containing accelerators of the invention are demonstrated in Table 5. Stocks 1 and 5 are controls containing conventional accelerator systems comprising a thiazole accelerator and a thiuram coaccelerator. In Stock 3, the thiazole accelerator is replaced with an equal amount of an accelerator of the invention which composition has greater processing safety but exhibits a lower cure rate. In Stocks 2 and 4, one-third of the thiazole accelerator is replaced with accelerator of the invention with the resulting compositions exhibiting an enhanced cure rate while retaining the processing safety of the control stocks. Stocks 6 and 10 are controls containing conventional curatives. Stocks 7, 8, 9, 11 and 12 demonstrates that addition of accelerators of the invention substantially increases the cure rate (reduces $t_{90} - t_2$). Blooming is substantially reduced in EPDM vulcanizates by using accelerators of the invention in which R is alkyl of 6-12 carbon atoms.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for vulcanizing rubber which comprises heating a sulfur-vulcanizable diene rubber composition containing sulfur-vulcanizing agent and an accelerating amount of a compound of the formula

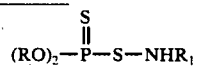

in which R and $R_1$ independently are alkyl of 1 to 12 carbon atoms, cycloalkyl of 5-8 carbon atoms, alkaryl of 7 to 10 carbon atoms, phenyl or mono- or di-lower alkyl substituted phenyl.

2. The process of claim 1 in which R and $R_1$ are lower alkyl.

3. The process of claim 2 in which $R_1$ is tert-butyl.

4. The process of claim 3 in which R is n-butyl.

5. The process of claim 3 in which R is isopropyl.

6. A process for vulcanizing rubber which comprises heating a sulfur-vulcanizable diene rubber composition containing sulfur-vulcanizing agent, an accelerating agent selected from the group consisting of thiazole acceleraor, dithiocarbamate accelerators, thioperoxydiphosphate accelerators, zinc phosphorodithioate accelerators, thiuram sulfide accelerators, aldehyde-amine accelerators, diaryl guanidine accelerators and mixtures thereof and, in an amount effective to enhance the vulcanization rate of the composition, a compound of the formula

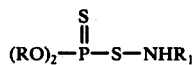

in which R and $R_1$ independently are alkyl of 1 to 12 carbon atoms, cycloalkyl of 5–8 carbon atoms, alkaryl of 7 to 10 carbon atoms, phenyl or mono- or di-lower alkyl substituted phenyl.

7. The process of claim 6 in which R and $R_1$ are lower alkyl.

8. The process of claim 7 in which $R_1$ is tert-butyl.

9. The process of claim 8 in which R is n-butyl.

10. The process of claim 8 in which R is isopropyl.

11. A vulcanizable composition comprising diene rubber, sulfur-vulcanizing agent and, in an amount to enhance the vulcanization rate of the composition, a compound of the formula

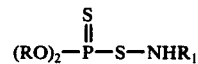

in which R and $R_1$ independently are alkyl of 1 to 12 carbon atoms, cycloalkyl of 5–8 carbon atoms, alkaryl of 7 to 10 carbon atoms, phenyl or mono- or di-lower alkyl substituted phenyl.

12. The composition of claim 11 in which R and $R_1$ are lower alkyl.

13. The composition of claim 12 in which $R_1$ is tert-butyl.

14. The composition of claim 13 in which R is n-butyl.

15. The composition of claim 13 in which R is isopropyl.

16. The composition of claim 11 containing as an additional ingredient an accelerating agent selected from the group consisting of thiazole accelerators, dithiocarbamate accelerators, thioperoxydiphosphate accelerators, zinc phosphorodithioate accelerators, thiuram sulfide accelerators, aldehyde-amine accelerators, diaryl guanidine accelerators and mixtures thereof.

17. The composition of claim 16 in which the accelerating agent is a thiazole accelerator.

18. The composition of claim 16 in which the accelerating agent is a thiuram sulfide accelerator.

* * * * *